United States Patent [19]

Andrews

[11] 4,339,884

[45] Jul. 20, 1982

[54] APPARATUS FOR DRYING FISH, ESPECIALLY SQUID

[76] Inventor: Donald Andrews, P.O. Box 88, Topsail, Newfoundland, Canada, A0A 3Y0

[21] Appl. No.: 204,317

[22] Filed: Nov. 5, 1980

[30] Foreign Application Priority Data

Jul. 28, 1980 [CA] Canada ................................. 357145

[51] Int. Cl.$^3$ ..................... F26B 25/10; F26B 11/18
[52] U.S. Cl. .......................................... 34/93; 34/38; 34/236; 414/527; 426/465
[58] Field of Search ................ 426/314, 465; 414/527, 414/269, 403; 34/93, 38, 236

[56] References Cited

U.S. PATENT DOCUMENTS

3,751,821  8/1973  Olmo et al. ............................. 34/93
3,955,343  5/1976  Tico ..................................... 414/403
4,170,432  10/1979  Pia ...................................... 414/269

*Primary Examiner*—Larry I. Schwartz

[57] ABSTRACT

A novel apparatus and method are provided for drying or otherwise processing fish. The apparatus includes a generally prone or slightly sloped frame having an upper perforated bed or flake and a lower pair of parallel tracks or rails. An upright framework is disposed at one end of the frame and is adapted to run along the tracks or rails from that one end to the opposite end. A roller mechanism including a round or polygonal roller is rotatably and preferably removably mounted in the upright framework. A mesh material is secured at one end to the roller mechanism and is extended along the flake and is secured to the opposite end of the frame. Means are provided for simultaneously moving the upright framework along the rails from the one end of the frame to the opposite end of the frame while winding the mesh material on the roller mechanism. In this way the mesh material is converted from a spread orientation disposed in an extended position atop the flake with the framework at one end of the frame, and a storage orientation with the mesh material wound on the roller mechanism with the framework at the other end of the frame. The fish wound on the mesh material on the roller can be removed and placed in any desired processing atmosphere or may be unwound to an inverted position.

19 Claims, 9 Drawing Figures

APPARATUS FOR DRYING FISH, ESPECIALLY SQUID

BACKGROUND OF THE INVENTION

2. Field of the Invention

This invention relates to an apparatus and method for processing of fish, e.g., for the outdoor drying of fish, particularly squid, or for the smoking of fish, or for the individual quick freezing of fish.

2. Description of the Prior Art

Outdoor drying of fish is well known as being the most economical means of drying fish, particularly in remote fishing villages. Generally, this consists merely of spreading the fish to be dried on an outdoor platform and to wait until the ambient atmospheric conditions dry the fish. Since ambient atmosphere is used, drying is subject to the vagaries of the ambient atmosphere. Particularly harmful are periods of precipitation. Outdoor drying of squid is particularly troublesome due to the non-uniform irregular shapes of squid.

Fish nowadays may be cured by drying, smoking, salting, or pickling. In the drying process, the step of drying fish by blowing warm dry air on them as largely replaced sun drying in some areas.

Other fish, e.g., herring, salmon, smelt and mackerel are smoked. The cleaned fish are salted, washed and drained and then hung on frames to dry. Then they are hung in the smokehouse for curing.

Freezing keeps fish longer and generally in better condition than other curing techniques. Quick freezing at extremely low temperatures ensures fresh flavour and texture. The fish are placed on a conveyor and are passed through a freezing tunnel, where they are sprayed with liquid nitrogen to freeze them, the so-called Individual Quick Freezing (I.Q.F.).

The processing of fish has been the subject of patents for many years. Canadian Pat. No. 53,009 "Method of and Apparatus for Smoking Fish," issued July 22, 1896 to Carl Waldemann, teaches a process of smoking fish consisting of cutting the fish in longitudinal sections, placing a piece of membranous or similar appropriate material upon the inner split surface, and laying the fish upon a frame over the smoke. The frame, which holds the fish while being smoked, consists of a number of triangular transverse frame pieces having base ledge projections and wire screen surfaces fitted thereon and also inclined in opposite directions.

Canadian Pat. No. 205,314 entitled "Process of Kippering Fish" issued Nov. 2, 1920 to Carl G. Villen, describes a fish preserving process which includes the first step of subjecting the fish to the action of smoke under pressure, and finally to the step of subjecting the smoked fish to a temperature to cook the fish.

Canadian Pat. No. 294,184 entitled "Process of Smoking Fish Fillets" issued Oct. 22, 1929 to James R. Turner, provides a process for smoking fish fillets by placing the fresh fillets on a screen and "setting" them therein while the screen is in a substantially horizontal position, and then tilting the screen to a steeply inclined position and passing smoke upwardly past both sides of the screen.

Canadian Pat. No. 236,588 entitled "Refrigeration System" issued Dec. 25, 1923 to Harden F. Taylor, provides a process for freezing fish by suspending them in a vertical position, causing a refrigeration liquid of 0° C. or colder to shower or spray over the fish, and causing the suspended fish to travel through the shower.

Canadian Pat No. 998,973 entitled "Superchilling of Fish" issued Oct. 26, 1976 to Liquid Carbon Canada Ltd., relates to a method of processing and packing fresh fish and fresh fish fillet. It provides an improvement in what is known as "superchilling." This involves cooling the fish to 23°-30° F., a partial freezing or glazing process which affects only the outer layers of fish or fillet. It reduces weepage and shrinkage and curtails bacterial action at that temperature by sealing the surfaces. Superchilling can be achieved by several means: brine tanks or baths, cold rooms, mechanical blast freezers, or other means generally classified as mechanical. However, this application decribes the quickest and most effective way, namely the use of an expendable refrigerant, for example, liquid nitrogen, liquid argon, liquid air, or liquid carbon dioxide. All absorb heat from the fish by going through a change of state and becoming gas and are subsequently either exhausted or recirculated and exhausted. Usually the refrigerant liquid first flashes to liquid and gas with the liquid subsequently evaporating; however, at atmospheric pressure liquid carbon dioxide forms gas and solid with the solid phase, in the form of dry ice snow, ultimately subliming to gas. One known apparatus for carrying out this method involves the use of a hood and the refrigerant is dispensed on top of the contents of an insulating box essentially box-by-box or sequentially. An alternative apparatus involves using a tunnel or spiral refrigerator to cool a number of uninsulated boxes at a time employing both gas and solid/liquid phases. A third apparatus has been envisaged in which dry ice nuggets, pellets, or slabs, are applied to the fish.

The patentee's development uses the broad principles of superchilling. An important feature is the speed with which the fish is chilled to the 28°-30° F. range. With expandable refrigerant, particularly dry ice snow, this is about 1-2 hours when the fish is initially at 55° F. and approximately 0.11 lb. of dry ice snow per lb. of fish is used. This is about one-sixth of the amount necessary to freeze the fish. In a typical embodiment of the patentee's invention, the proper amount of dry ice is produced by flashing with approximately 0.25 lb. of liquid carbon dioxide per lb. of fish. The dry ice snow sublimes and disappears, leaving its refrigeration in the fish. Thus, the patentee provided a process of packing and preserving fish, comprising superchilling a layer of fish or fillet by snowing with an amount of a normally gaseous expendable cryogenic refrigerant, and enclosing the resulting product with an insulating container.

SUMMARY OF THE INVENTION (i) Aims of the Invention

Accordingly, an object of this invention is the provision of a apparatus and method for the drying of fish which can compensate for adverse ambient atmospheric conditions.

Another object of the present invention is to provide a novel apparatus for the processing, i.e., the curing and/or preserving and/or freezing of fish in a wide choice of atmospheres or environments.

Yet another object of the present invention is to provide a novel method for the processing of fish, i.e., the curing and/or preserving and/or freezing of fish, in a wide choice of atmospheres or environments.

(ii) Statements of Invention

The present invention provides, in one embodiment thereof, apparatus for the processing of fish comprising: (a) a frame having an upper perforated bed or flake and a lower pair of parallel tracks or rails; (b) an upright framework associated with the frame and disposed at one end of the frame adapted to be moved along the tracks or rails from that one end of the frame to the opposite end of the frame; (c) a roller mechanism including a round or polygonal roller rotatably mounted in the upright framework; (d) a mesh material; (e) means for securing one end of the mesh material to the roller; (f) means for securing the other end of the mesh material to the opposite end of the frame; and (g) means for simultaneously moving the upright framework along the rails from the one end of the frame to the opposite end of the frame while winding the mesh material on the roller mechanism, whereby the mesh material is converted from a spread orientation disposed in an extended position atop the flake with the framework at one that end of the frame, and a storage orientation with the mesh material wound on the roller mechanism with the framework at the opposite end of the frame.

(iii) Other Features of the Invention

By one feature of this invention, the upright framework is a wheeled upright framework rollably mounted with respect to the parallel tracks or rails.

By another feature of this invention, the upright framework is slidably mounted with respect to the parallel tracks or rails.

By yet another feature of this invention, the roller mechanism includes the roller removably but rotatably mounted on the upright framework.

By still another feature of this invention, the roller mechanism includes the roller as a hollow roller with a porous or foraminous shell, removably but rotatably mounted on the upright framework.

By yet another feature of this invention, the tracks or rails are sloped downwardly from the one end of the frame to the opposite end of the frame.

By a still further feature of this invention, the perforated bed comprises a large open mesh wire screen.

By yet a still further feature of this invention, the apparatus is for ambient atmosphere drying of fish wherein the opposite end of the frame is disposed in the ambient atmosphere, and the one end of the frame is disposed in an enclosure having a predetermined atmosphere.

By another feature of this invention, the apparatus includes means for injecting a predetermined atmosphere within the hollow roller.

By yet another feature of this invention, the roller is rotated by a manually operated crank.

By a still further feature of this invention, the roller mechanism comprises a roller rotatably mounted in a pair of spaced-apart bearing blocks, and includes a crank arm for the rotation of the roller.

By yet a still further feature of this invention, the roller mechanism comprises a roller rotatably mounted in a pair of spaced-apart bearing blocks, and includes a crank arm for the rotation of the roller; and the bearing blocks are selectively positionable within spaced-apart vertically disposed guideways.

By a still further feature of this invention, the roller mechanism comprises a roller rotatably mounted in a pair of spaced-apart bearing blocks, and includes a crank arm for the rotation of the roller; the bearing blocks are selectively positionable within spaced-apart vertically disposed guideways; and the bearing blocks are floatingly mounted by means of coil springs.

By a further feature of this invention, the roller mechanism comprises a roller rotatably mounted in a pair of spaced-apart bearing blocks, and includes a crank arm for the rotation of the roller; the bearing blocks are selectively positionable within spaced-apart vertically disposed guideways; and the vertically upward movement of the bearing blocks is limited by a controlled, positively positioned limit block.

By yet another feature of this invention, the roller mechanism comprises a roller rotatably mounted in a pair of spaced-apart bearing blocks, and includes a crank arm for the rotation of the roller; the bearing blocks are selectively positionable within spaced-apart vertically disposed guideways; the vertically upward movement of the bearing blocks is limited by a controlled, positively positioned limit block; and the position of the limit block is controlled by a set screw.

By another feature of this invention, the wheeled upright frame or car includes a second roller whose cylindrical surface is adapted to engage that cylindrical surface of the first roller to which the mesh is attached, the second roller being rotatably mounted between a pair of lift arms pivotally mounted on the upper portion of the wheeled frame or car.

By yet another feature of this invention, the roller includes an extended slit for the accommodation of the mesh material thereon.

By still another feature of this invention, the roller and the mesh material are provided with cooperating hoop-and-loop type fasteners, e.g., known by the trade mark of VELCRO thereby temporarily but selectively to secure the mesh material to the roller.

By a still further feature of this invention, the mesh material is a fine mesh nylon, saran, or glass fiber screen.

BRIEF DESCRIPTION OF THE DRAWINGS

In the accompanying drawings.

DESCRIPTION OF PREFERRED EMBODIMENTS

Figure 1:
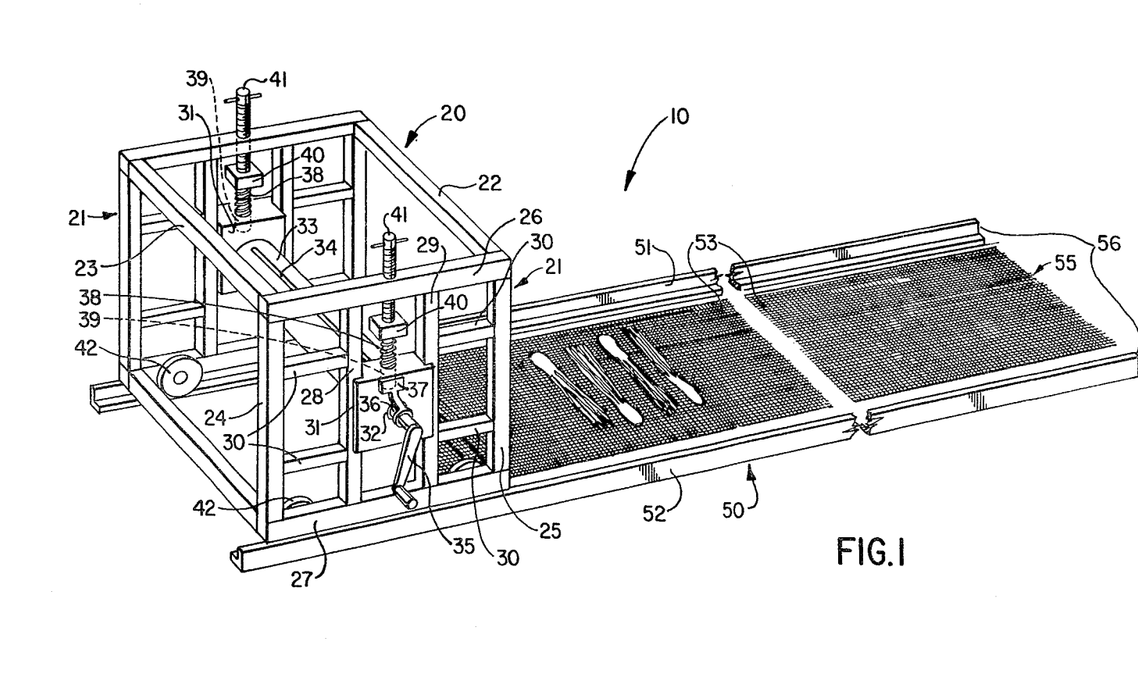
FIG. 1 is a perspective view of the ambient atmosphere, fish drying apparatus of one embodiment of this invention.
Figure 2:
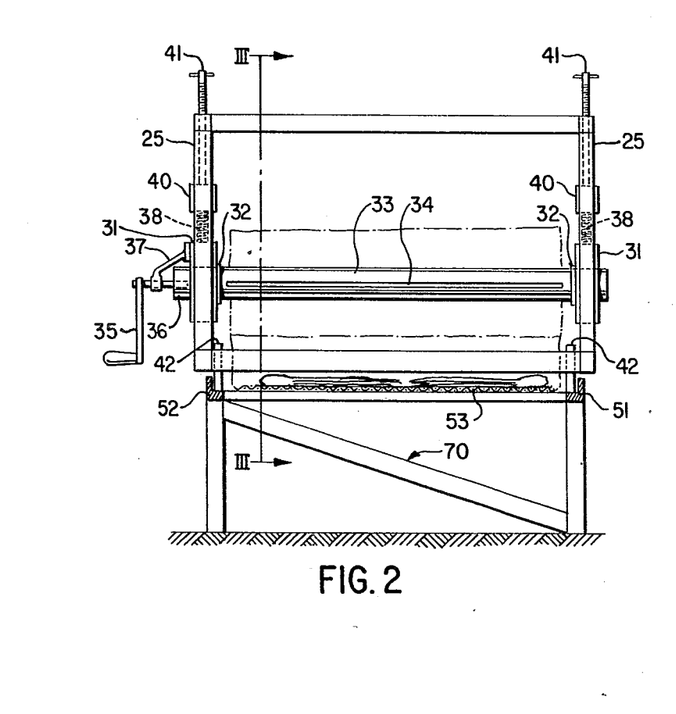
FIG. 2 is a front elevational view of a portion of an apparatus of one embodiment of this invention.
Figure 3:
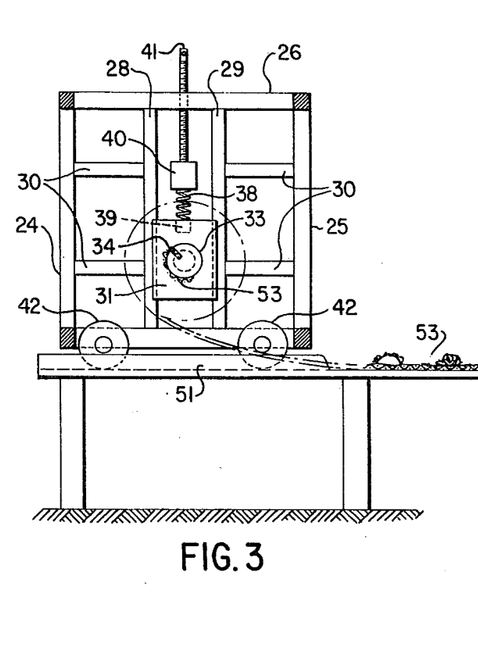
FIG. 3 is a section along the line III—III of FIG. 2.

Description of FIGS. 1-3

As seen in FIG. 1, the ambient atmosphere, fish drying apparatus 10 includes an upright framework 20 and a generally prone frame 50. The upright framework 20 is generally in the form of an open rectangular parallelepiped comprised of a pair of substantially identical side frame members 21 and connecting forward piece 22 and rear piece 23. Each side frame member 21 includes lateral vertical studs 24, 25 secured to upper plate 26 and lower plate 27. A pair of parallel, spaced-apart vertical guideways 28, 29 are secured to the plates 26, 27. Horizontal bracing cross-pieces 30 extend between studs 24 and guideway 28 and guideway 29 and stud 25.

Slidably disposed between guideways 28, 29 are bearing blocks 31, each having a bearing 32 secured therein. A roller 33 having an extended slot 34 therein is rotatably mounted in the bearings 32. A crank arm 35 is secured at the end 36 of the roller 33. The crank is supported for rotation by an arm 37 secured to the upper portion of the bearing block 31. The bearing blocks 31 are "floatingly" mounted within the guideways 28, 29 by means of coil springs 38, the bottom of which rest in a well 39 in the bearing block 31, the upper end of which abuts a limit block 40. The vertical position of limit block 40 within guideways 28, 29 is set by means of set screws 41 threadedly cooperating with upper plate 26.

The upright framework 20 is adapted for selective movement along the frame 50 by means of four wheels 42 rotatably mounted on the lower plate 27, and adapted to roll along parallel lower tracks or rails of the frame 50.

The frame 50 includes a pair of parallel, spaced-apart upper ways 51, 52, operatively associated with the upright framework 20 to provide a perforated upper flake. They may be operatively associated by being secured to the front butt edges of lower plates 27, or they may extend underneath wheels 41 to the rear edges of lower plates 27. The ways 51, 52 may preferably be provided with transverse slats or large, open mesh wire screen (not shown) to support the mesh material 53. Preferably, the mesh material 53 is fine mesh nylon, saran or glass fiber screen. One end 54 of mesh material 53 is adapted to be secured within slot 34 of roller 33. The other end 55 of mesh material 53 is preferably held down (by means not shown) at the distal end 56 of the flake. The hold-down means may be cooperating VELCRO-type fasteners on the mesh material and on the perforated flake.

As shown in FIGS. 2 and 3, the ambient atmosphere fish drying apparatus 10 is shown with its frame 50 supported on an auxiliary apparatus framework 70. While not shown, the roller may be removably yet rotatably mounted on the upright framework, and may be round or polygonal, hollow or solid.

Figure 4:
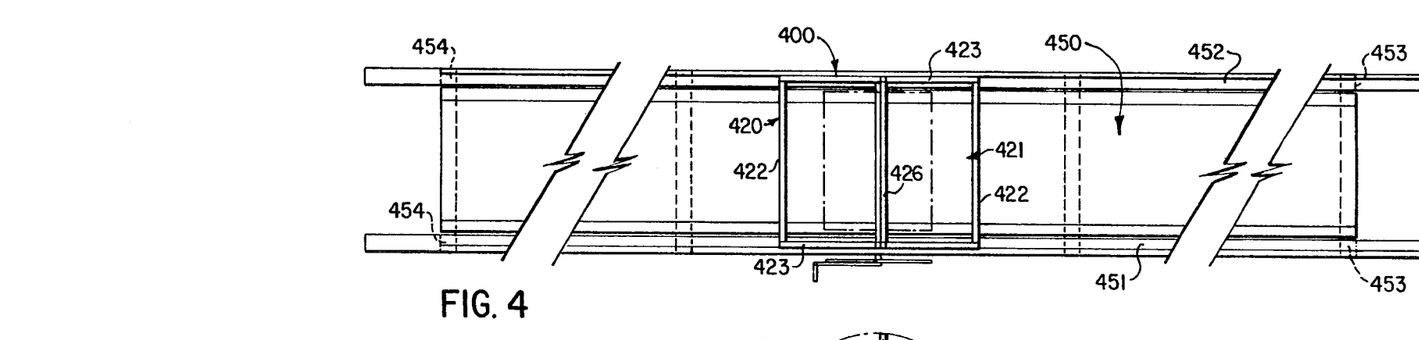
FIG. 4 is a top plan view of a fish drying apparatus of another embodiment of this invention.
Figure 5:
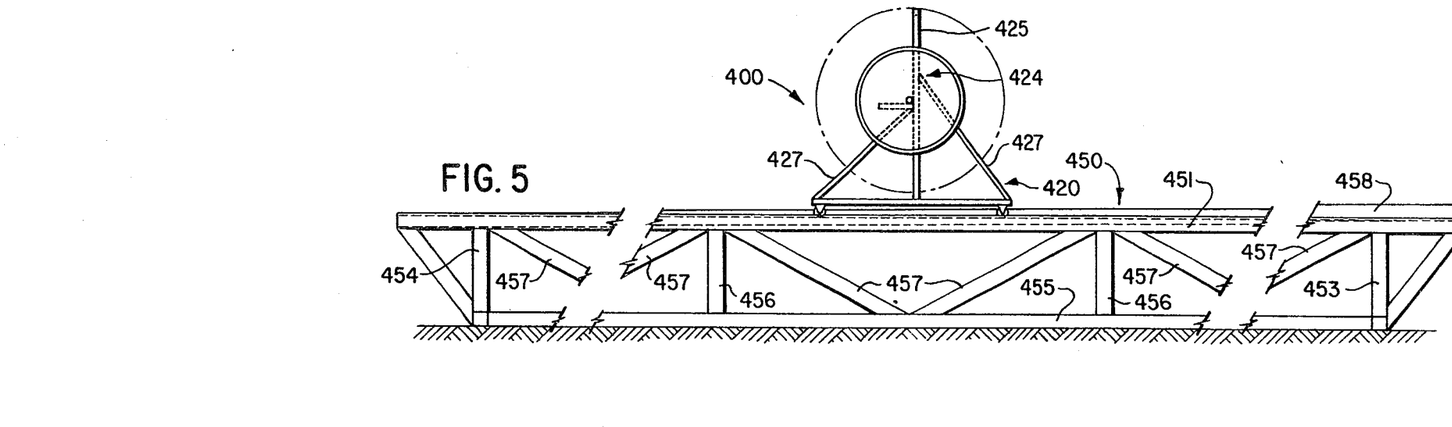
FIG. 5 is an elevational view of one variant of the fish drying apparatus of the embodiment of FIG. 4.

Description of FIGS. 4 and 5

As seen in FIGS. 4 and 5, the ambient atmosphere fish drying apparatus 400 includes a car rollably mounted on a frame 450. The frame 450 includes a pair of parallel, spaced-apart lower tracks or rails 451, 452, mounted on forward and rearward legs 453, 454 supported on parallel, spaced-apart skids 455. A bracing framework of uprights 456 and diagonal 457 members is also provided. By these means, the car 420 can be rolled along the tracks or rails 451, 452. In the embodiment of FIG. 4, the tracks or rails 451, 452 are horizontal. However, in the embodiment of FIG. 5, the frame 450 includes an additional set of tracks or rails 458, which are elevated at the forward end, so that the car 420 naturally tends to roll to the rear. The upper flake may preferably be provided with transverse slats or wide open mesh wire screen (not shown) to support the mesh material.

The car 420 includes a flat rectangular base 420 including a pair of longitudinal bars 422, interconnected by a pair of transverse bars 423, and a central upright, generally rectangular framework 424 including a pair of vertical bars 425 interconnected by a pair of horizontal bars 456. The framework 424 is braced by forward and rearward sloping bars 427.

Figure 6:
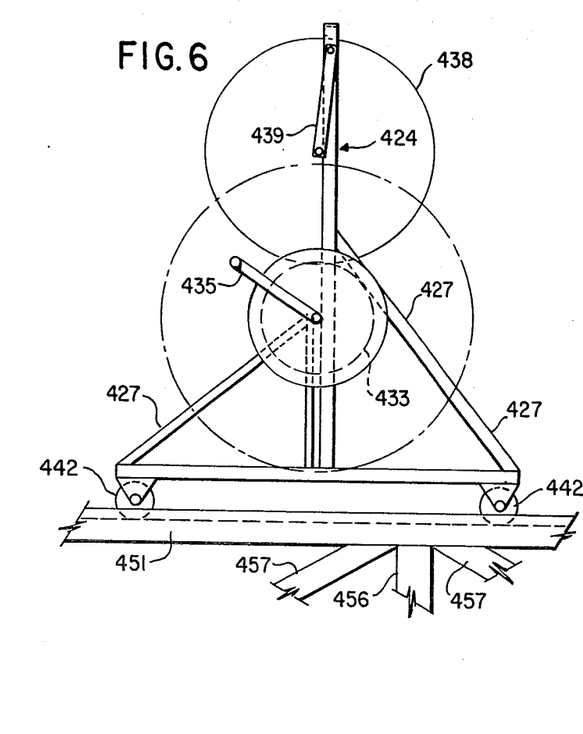
FIG. 6 is a side elevational view of the car forming an essential element of the fish drying apparatus of FIG. 4.
Figure 7:
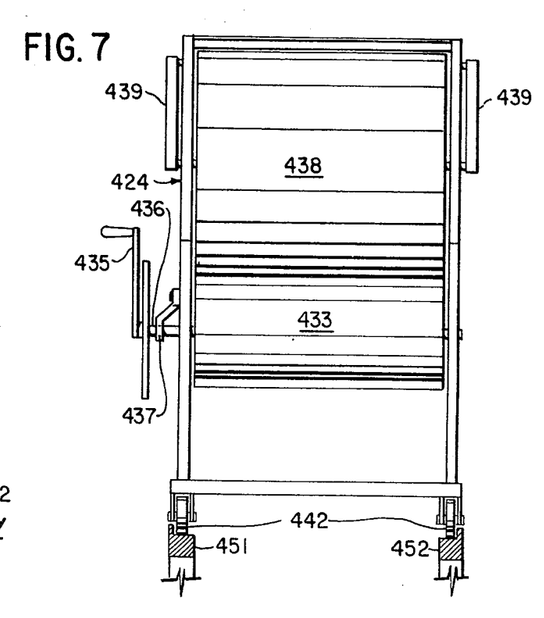
FIG. 7 is a front elevational view of the car forming an essential element of the fish drying apparatus of FIG. 4.

Description of FIGS. 6 and 7

As seen in FIGS. 6 and 7, the upright framework 424 has mounted therein for positive rotation, a roller 433 rotatably mounted in bearings. A crank arm 435 is secured at the end 436 of the roller 433. The crank 435 is supported for rotation by an arm 437 secured to the upper portion of a bearing block. A second roller 438 is rotatably mounted within pivotally mounted spaced-apart lift arms 439. In this way, the second roller 438 always contacts either the first roller 433 or the mesh material wound thereon, either empty or with fish thereon. It is noted that the car 420 of FIGS. 6 and 7 is provided with four wheels 442 to roll on rails or tracks 451, 452.

Figure 8:
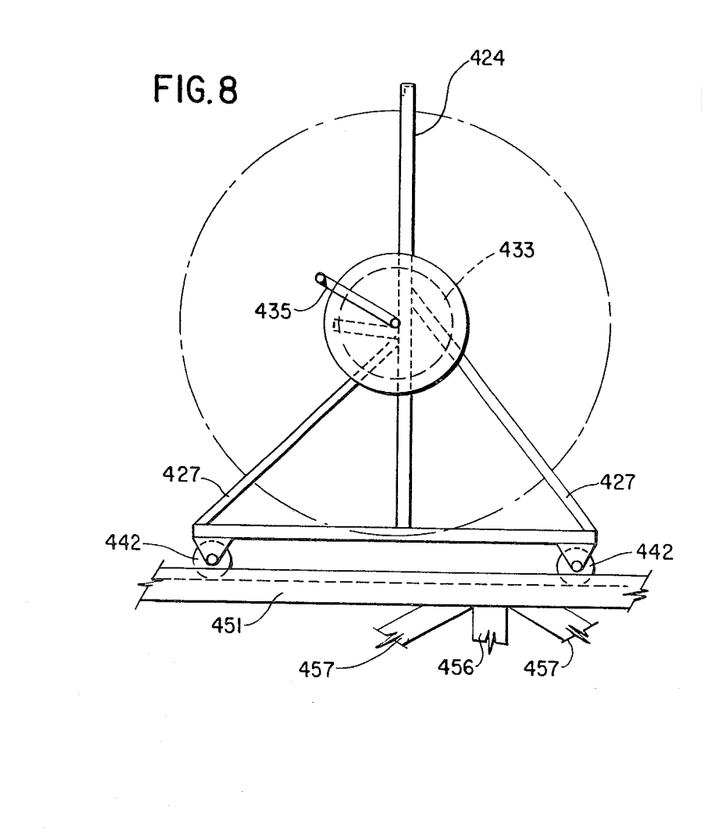
FIG. 8 is a side elevational view of the car forming an essential element of the fish drying apparatus of FIG. 5.
Figure 9:
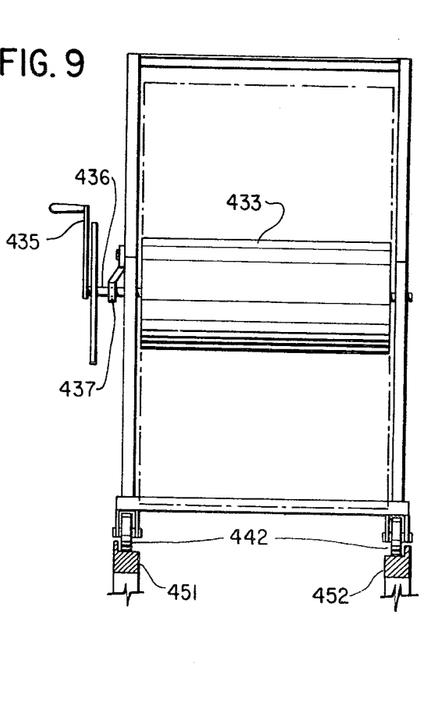
FIG. 9 is a front elevational view of the car forming an essential element of the fish drying apparatus of FIG. 5.

The car 420 shown in FIGS. 8 and 9 is essentially of the same external appearance as that of FIGS. 6 and 7. However, only one roller 433 is provided. Since the tracks or rails are sloped, there is no need for any drag elements on the mesh.

As in the embodiments of FIGS. 1-3, a mesh material, preferably of fine mesh nylon, saran or glass fiber screen is provided. One end of the mesh material is securable within a slot of the roller or otherwise securable as described above. The other end of the mesh material is preferably held down (by means not shown) at the front end of frame 450, as described hereinabove.

Operation of Preferred Embodiments

In operation, the ambient atmosphere, fish drying apparatus 10 is disposed with the upright framework 20 within an enclosure and with the frame 50 outside in the ambient atmosphere. The mesh material 53 is extended out to the distal end of frame 50. In drying, ambient atmospheric conditions, the fish, e.g., squid, is placed on the mesh material to dry. During periods of inclement atmospheric conditions, the crank 35 is turned to roll up the mesh 53 with the fish thereon onto the roller 33, while the upright framework is simultaneously moved out of the enclosure. During the early stages of the winding, the set screw 41 is turned down so that the "floating" bearing blocks 31 are urged to a lower position. As winding-up proceeds, the set screw 41 is turned up, to allow the bearing blocks 31 to move upwardly. Then the upright framework with the fish wound on the roller is moved back into the enclosure. Thus, the partially dried fish will be brought into a protective environment.

When the inclement weather changes to conditions favourable to drying, the mesh with the fish thereon is unreeled to its initial condition. There is no limit to the number of such reeling—unreeling cycles as follows: The upright framework with the fish wound on its roller is placed at the distal end of the flake. Then the roller is unwound or unreeled while simultaneously moving the upright framework back to the enclosure.

The fish on the mesh may be transferred to a second mesh, i.e., may be turned over placing the second mesh over the first and by reeling and unreeling from the near end of the flake.

In the application of the method using the apparatus of this invention for drying in an atmosphere of warm dry air, the flake including rails thereon is placed either permanently or temporarily partially within a drying house supplied with means for providing streams of warm drying air and partially outside such drying house. The upright frame having the mesh material wound on the roller of its roller mechanism is moved to the proximity of the drying house or the wheeled upright frame may be positioned at one end of the flake. The mesh material is then unwound while simultaneously moving the wheeled upright frame over the flake with the mesh material supported on the flake. The fish to be dried are placed on the mesh and the fish dried in the atmosphere of warm dry air. When they are dried, the mesh with the dried fish is wound on the roller and simultaneously the wheeled upright frame or car removed from the flake in the drying house. Thus, unloading of the dried fish can take place outside the drying house while additional fish to be dried may be loaded onto another wheeled car to be placed on the flake in the drying house.

Alternatively, in the case where the roller is removable, a plurality of fish-wound rollers may be used for loading or unloading into the fish processing area.

Moreover, in the case of a hollow roller, the fish-wound roller may be injected with the selected processing atmosphere, e.g., drying, smoking, freezing, etc.

In the application of the method using the apparatus of this invention to curing by smoking, the flake including rails thereon is placed either permanently or temporarily partially within a smokehouse supplied with means for providing streams of selected smoke, and partially outside such smokehouse. The upright frame having the mesh material wound on the roller of its roller mechanism is moved to the proximity of the smokehouse or the wheeled upright frame may be positioned at one end of the flake. The mesh material is then unwound while simultaneously moving the wheeled upright frame over the flake with the mesh material supported on the flake. The fish to be smoked are placed on the mesh and the fish smoked in the atmosphere of the smokehouse. When they are smoked, the mesh with the smoked fish is wound on the roller and the wheeled upright frame or can be removed from the frame or flake in the smokehouse. Thus, unloading of the smoked fish can take place outside the smokehouse, while additional fish to be smoked may be loaded onto another wheeled car to be placed on the frame or flake in the smokehouse.

Alternatively, in the case where the roller is removable, a plurality of fish-wound rollers may be used for loading or unloading into the fish processing area.

Moreover, in the case of a hollow roller, the fish-wound roller may be injected with the selected processing atmosphere, e.g., drying, smoking, freezing, etc.

In the method using the apparatus of this invention of preserving fish by individual quick freezing (I.Q.F.), the flake is mounted partially within the freezing tunnel and partially upstream of it. The wheeled car is placed on the frame and the mesh material, wound on the roller of its roller mechanism, is unwound while the wheeled car is simultaneously moved along the frame. The fish to be individually quick frozen are placed on the mesh material while the wheeled car and mesh material are drawn into the tunnel where the fish are exposed to a nitrogen atmosphere to be quick frozen. Then the mesh with the fish thereon is wound on the roller of the roller mechanism, and the wheeled car or the removable roller, is removed from the freezehouse. Thus, unloading of the quick frozen fish can take place outside the freezehouse, while additional fish to be quick frozen may be loaded onto another wheeled car or removable roller to be placed on the flake in the freezehouse.

Alternatively, in the case where the roller is removable, a plurality of fish-wound rollers may be used for loading or unloading into the fish processing area.

Moreover, in the case of a hollow roller, the fish wound-roller may be injected with the selected processing atmosphere, e.g., drying, smoking, freezing, etc.

Summary

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. Apparatus for the processing of fish which comprises:
    (a) a frame having an upper perforated bed or flake and a lower pair of parallel tracks or rails;
    (b) an upright framework associated with said frame and disposed at one end of said frame and adapted to be moved along the tracks or rails from said one end of said frame to the opposite end of said frame;
    (c) a roller mechanism including a round or polygonal roller rotatably mounted in said upright framework;
    (d) a mesh material;
    (e) means for securing one end of said mesh material to said roller;
    (f) means for securing the other end of said mesh material to the opposite end of said frame; and
    (g) means for simultaneously moving said upright framework along said rails from said one end of said frame to the opposite end of said frame while winding said mesh material on said roller mechanism, whereby said mesh material is converted from a spread orientation disposed in an extended position atop said flake with said framework at said one end of said frame, and a storage orientation with said mesh material wound on said roller mechanism with said framework at said opposite end of said frame.

2. The apparatus of claim 1 wherein said upright framework is a wheeled upright framework rollably mounted with respect to said parallel tracks or rails.

3. The apparatus of claim 2 wherein said wheeled upright frame or car includes a second roller whose cylindrical surface is adapted to engage that cylindrical surface of the first roller to which the mesh is attached, said second roller being rotatably mounted between a pair of lift arms pivotally mounted on the upper portion of said wheeled frame or car.

4. The apparatus of claim 1 wherein said upright framework is slidably mounted with respect to said parallel tracks or rails.

5. The apparatus of claim 1 wherein said roller mechanism includes said roller removably but rotatably mounted on said upright framework.

6. The apparatus of claim 1 wherein said roller mechanism includes said roller as a hollow roller with a porous or foraminous shell, removably but rotatably mounted on said upright framework.

7. The apparatus of claim 6 including means for injecting a predetermined atmosphere within said hollow roller.

8. The apparatus of claim 1 wherein said tracks or rails are sloped downwardly from said one end of said frame to said opposite end of said frame.

9. The apparatus of claim 1 wherein said perforated bed comprises a large open mesh wire screen.

10. The apparatus of claim 1 for ambient atmosphere drying of fish wherein said opposite end of said frame is disposed in the ambient atmosphere, and wherein said one end of said frame is disposed in an enclosure having a predetermined atmosphere.

11. The apparatus of claim 1 wherein said roller is rotated by a manually operated crank.

12. The apparatus of claim 1 wherein said roller mechanism comprises a roller rotatably mounted in a pair of spaced-apart bearing blocks, and including a crank arm for the rotation of said roller.

13. The apparatus of claim 1 wherein: said roller mechanism comprises a roller rotatably mounted in a pair of spaced-apart bearing blocks, and including a crank arm for the rotation of said roller; and wherein said bearing blocks are selectively positionable within spaced-apart vertically disposed guideways.

14. The apparatus of claim 1 wherein: said roller mechanism comprises a roller rotatably mounted in a pair of spaced-apart bearing blocks, and including a crank arm for the rotation of said roller; wherein said bearing blocks are selectively positionable within spaced-apart vertically disposed guideways; and wherein said bearing blocks are floatingly mounted by means of coil springs.

15. The apparatus of claim 1 wherein: said roller mechanism comprises a roller rotatably mounted in a pair of spaced-apart bearing blocks, and including a crank arm for the rotation of said roller; wherein said bearing blocks are selectively positionable within spaced-apart vertically disposed guideways; and wherein the vertically upward movement of the bearing blocks is limited by a controlled, positively positioned limit block.

16. The apparatus of claim 1 wherein: said roller mechanism comprises a roller rotatably mounted in a pair of spaced-apart bearing blocks, and including a crank arm for the rotation of said roller; wherein said bearing blocks are selectively positionable within spaced-apart vertically disposed guideways; wherein the vertically upward movement of the bearing blocks is limited by a controlled, positively positioned limit block; and wherein the position of the limit block is controlled by a set screw.

17. The apparatus of claim 1 wherein said roller includes an extended slit for the accommodation of said mesh material thereon.

18. The apparatus of claim 1 wherein said roller and said mesh material are provided with cooperating hoop and loop-type fasteners, thereby temporarily but selectively to secure said mesh material to said roller.

19. The apparatus of claim 1 wherein said mesh material is a fine mesh nylon, saran, or glass fiber screen.

* * * * *